United States Patent Office 3,294,870
Patented Dec. 27, 1966

3,294,870
ORGANOPHOSPHORUS-COPPER COMPLEX COMPOUNDS AND THEIR USE FOR PRODUCING FIRE RETARDANT PLASTICS
Martin Grayson and Allan Ellis Sherr, Norwalk, and Helen Currier Gillham and Mary Ester Castellion, Stamford, Conn., assignors to American Cyanamid Company, Stamford, Conn., a corporation of Maine
No Drawing. Filed Mar. 24, 1964, Ser. No. 354,433
9 Claims. (Cl. 260—893)

This invention relates to a novel class of compounds. More particularly, this invention relates to a novel class of organophosphorus-copper complex compounds. Still more of particularly, this invention relates to various flame-retardant compositions comprising thermoplastic polymers containing a flame-retarding amount of an organophosphorus-copper complex compound.

The search for compounds, mixtures of compounds or compositions of matter as flame retardants for thermoplastic polymers has been intensively conducted industrially. The use of materials containing phosphorus and/or nitrogen atoms as flame-retardant additives for some polymers has been recognized, as has been the use of various halogenated materials such as the halogenated styrene copolymers and various additive mixtures such as chlorinated paraffin wax with triphenyl stibine, chlorinated paraffins with aliphatic antimony compounds, and antimony-oxide-chlorinated hydrocarbon mixtures. A drawback, however, in regard to the known prior art materials whtich have been used as flame retardants, has been the fact that generally a large amount, i.e. upwards of 35%, of the additive must be incorporated into the polymer in order to make it sufficiently flame retardant. Additionally, the known flame retardant additives have a tendency to crystallize or oil out of the resin a relatively short time after incorporation.

We have now found a new group of compounds which may be used, by adding them to thermoplastic resins, in relatively small amounts, to produce excellent flame-retardant compositions. A further feature of our invention resides in the fact that these new additives do not crystallize or oil out after incorporation into the resin even after an extensive length of time.

The production of thermoplastic resin compositions which are flame-retardant, i.e. have high resistance to burning, is of considerable commercial importance. For example, such articles as castings, moldings, foamed or laminated structures and the like are required, or at least desired, to be resistant to fire and flame and to possess the ability to endure heat without deterioration. Typical illustrations of applications of materials of this type include moldings for live electrical contacts which should not be ignited or deteriorated by heat and sparks. Additionally, structural members such as pipes, wall coverings, wall paneling, glazing, etc. and articles such as ash trays, waste baskets, fibers and the like are further examples of products wherein flame retardance is desirable.

It is therefore an object of the present invention to provide a novel class of compounds.

It is a further object of the present invention to provide a novel class of organophosphorus-copper complex compounds.

It is a further object of the present invention to provide flame-retardant compositions composing thermoplastic polymers containing a flame-retarding amount of an organophosphorus-copper complex compound.

These and other objects will become more apparent to those skilled in the art upon reading the more detailed description set forth hereinbelow.

THE NOVEL COMPOUNDS

The novel organophosphorus-copper complex compounds of the instant invention are represented by the formula

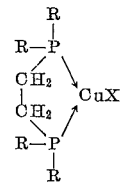

wherein X is a monovalent anion and R is an aryl or a β-cyanoethyl radical.

These compounds are solid in nature and have relatively high melting points, e.g., as high as 280° C. They are soluble in such organic solvents as benzene, toluene, chloroform and the like and are insoluble in diethyl ether, water, tetrahydrofuran and the like.

The compounds of Formula I may be produced, by reacting an ethylene-bis disubstituted phosphine with a copper salt, i.e. of the formula CuX. The reaction proceeds according to the equation:

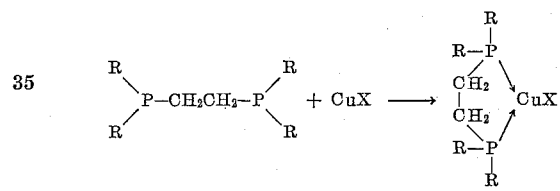

wherein R and X are as set forth hereinabove in regard to Formula I. The ethylenebis disubstituted phosphine starting material can be produced according to any known procedures, that shown in an article by Chatt et al., J. Chem. Soc. 1378, 1960, being exemplary.

The reaction is preferably carried out at room temperature and atmospheric pressure, although higher or lower temperatures and pressures may be used if circumstances so dictate. A solvent such as tetrahydrofuran, ethanol, aqueous potassium iodide and the like is used for both reactants. The amount of solvent used is not critical, except that enough should be employed to carry out its function, i.e. to solubilize the reactant.

The reaction is generally allowed to continue for from about 10 minutes to 1 hour, preferably 20 to 40 minutes, however, this range is not critical and shorter or longer times of contact may be used, if necessary.

The molar ratio of the ethylenebis compound to the copper salt used is about 1:1 although a slight excess of either reactant is tolerable.

The products may be recovered by filtration, centrifugation, etc. and may then be further purified by recrystallization, non-solvent washing and the like.

Compounds which are represented by Formula I and which are useful in producing our novel flame-retardant compositions include:

[ethylenebis(diphenylphosphine)]copper (I) iodide,
[ethylenebis(ditolylphosphine)]copper (I) iodide,
[ethylenebis(dixylylphosphine)]copper (I) iodide,
[ethylenebis(didurylphosphine)]copper (I) iodide,
[ethylenebis(di-1-naphthylphosphine)]copper (I) iodide,
[ethylenebis(di-2-naphthylphosphine)]copper (I) iodide,
{ethylenebis[bis($\beta$-cyanoethyl)phosphine]}copper (I) iodide,
[ethylenebis(diphenylphosphine)]copper (I) chloride,
[ethylenebis(ditolylphosphine)]copper (I) chloride,
[ethylenebis(dixylylphosphine)]copper (I) chloride,
[ethylenebis(didurylphosphine)]copper (I) chloride,
[ethylenebis(di-1-naphthylphosphine)]copper (I) chloride,
[ethylenebis(dis-2-naphthylphosphine)]copper (I) chloride,
{ethylenebis[bis($\beta$-cyanoethyl)phosphine]}copper (I) chloride,
[ethylenebis(diphenylphosphine)]copper (I) bromide,
[ethylenebis(ditolylphosphine)]copper (I) bromide,
[ethylenebis(dixylylphosphine)]copper (I) bromide,
[ethylenebis(didurylphosphine)]copper (I) bromide,
[ethylenebis(di-1-naphthylphosphine)]copper (I) bromide,
[ethylenebis(di-2-naphthylphosphine)]copper (I) bromide,
{ethylenebis[bis($\beta$-cyanoethyl)phosphine]}copper (I) bromide,
[ethylenebis(diphenylphosphine)]copper (I) nitrate,
[ethylenebis(ditolylphosphine)]copper (I) nitrate,
[ethylenebis(dixylylphosphine)]copper (I) nitrate,
[ethylenebis(didurylphosphine)]copper (I) nitrate,
[ethylenebis(di-1-naphthylphosphine)]copper (I) nitrate,
[ethylenebis(di-2-naphthylphosphine)]copper (I) nitrate,
{ethylenebis[bis($\beta$-cyanoethyl)phosphine]}copper (I) nitrate,
[ethylenebis(diphenylphosphine)]copper (I) acetate,
[ethylenebis(ditolylphosphine)]copper (I) acetate,
[ethylenebis(dixylylphosphine)]copper (I) acetate,
[ethylenebis(didurylphosphine)]copper (I) acetate,
[ethylenebis(di-1-naphthylphosphine)]copper (I) acetate,
[ethylenebis(di-2-naphthylphosphine)]copper (I) acetate,
{ethylenebis[bis($\beta$-cyanoethyl)phosphine]}copper (I) acetate,
[ethylenebis(diphenylphosphine)]copper (I) phenate,
[ethylenebis(ditolylphosphine)]copper (I) phenate,
[ethylenebis(dixylylphosphine)]copper (I) phenate,
[ethylenebis(didurylphosphine)]copper (I) phenate,
[ethylenebis(di-1-naphthylphosphine)]copper (I) phenate,
[ethylenebis(di-2-naphthylphosphine)]copper (I) phenate,
{ethylenebis[bis($\beta$-cyanoethyl)phosphine]}copper (I) phenate,
[ethylenebis(diphenylphosphine)]copper (I) benzoate,
[ethylenebis(ditolylphosphine)]copper (I) benzoate,
[ethylenebis(dixylylphosphine)]copper (I) benzoate,
[ethylenebis(didurylphosphine)]copper (I) benzoate,
[ethylenebis(di-1-naphthylphosphine)]copper (I) benzoate,
[ethylenebis(di-2-naphthylphosphine)]copper (I) benzoate,
{ethylenebis[bis($\beta$-cyanoethyl)phosphine]}copper (I) benzoate, and the like.

THE NOVEL FLAME-RETARDANT COMPOSITIONS

The thermoplastic polymers into which the novel compounds of our invention may be incorporated to produce the novel flame-retardant compositions of the present invention, are generally the vinyl type polymers wherein the monomeric material is polymerized, by any known method, via the vinyl unsaturation therein. Examples of the vinyl type polymers which may be used to form our novel compositions are the acrylates and methacrylates, the vinyl halides, the vinylidene halides, the vinyl acetates, polyvinyl butyral, butadiene copolymers, acrylonitrile-butadiene-styrene polymers, the acrylonitriles, etc. Additionally, and preferably, one may incorporate the flame-retardant agents mentioned above into the $\alpha$-olefin polymers, such as the homopolymers and copolymers, etc. containing, as the major constituent, ethylene, propylene, and the like and the acrylates and methacrylate polymers produced from monomers having the formula (II)

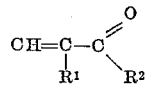

wherein $R^1$ is a hydrogen or methyl radical and $R^2$ is a hydrogen or an alkyl radical having from 1 to 6 carbon atoms, inclusive. Examples of monomers represented by Formula II include acrylic acid, methacrylic acid and their esters such as methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and the corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly, the allyl, methallyl, vinyl, methvinyl, butenyl, etc., unsaturated esters of aliphatic and aromatic monobasic acids, such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, propyl, ethyl, isopropyl, butyl, sec.-butyl, amyl, etc., esters of ethylenically unsaturated aliphatic monobasic acids, illustrative examples of which appear above, vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc. vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

These above mentioned monomers may be polymerized, copolymerized, etc., in any known manner such as by free-radical generating catalysts, irradiation, anion and cation type catalysts and the like, said method of polymerization forming no part of the present invention.

The novel flame-retardant compounds may be incorporated into the thermoplastic resins in flame-retarding amounts, i.e., amounts generally ranging from about 10%, by weight, to about 35%, by weight, preferably 15% to 25%, by weight, based on the weight of the resin have been found sufficient.

The organophosphorus-copper complex compounds may be incorporated into the resin by any known method. That is to say, the flame-retardant additive may be combined with the resin by milling the resin and the flame retardant complex on, for example, a two-roll mill, in a Banbury mixer, etc., or the copper complex may be added by molding it and resin simultaneously, extruding it and the resin or by merely blending the resin in powder form with the organophosphorus-copper complex compound and thereafter forming the final desired article. Additionally, the novel flame-retardant compounds may also be added during the resin manufacture, i.e., during the monomer polymerization procedure, provided the catalyst etc., and other ingredients of the polymerization system are inert thereto.

It is within the scope of the present invention to incorporate such ingredients as plasticizers, dyes, pigments, fillers, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

*Example 1*

A solution of 4.0 parts of ethylenebis(diphenylphosphine) in 20 parts of ethanol and 50 parts of tetrahydrofuran are mixed all at once at room temperature with a solution of 1.9 parts of cuprous iodide in 30% aqueous tetrahydrofuran containing 25 parts of potassium iodide. The precipitated product is filtered and washed with potassium iodide solution, with water, and with tetrahydrofuran. 5.4 parts of [ethylenebis(diphenylphosphine)] copper (I) iodide are recovered (91.5% of theoretical). Recrystallization from chloroform-diethylether gives a pure compound having a melting point of 283–285° C.

*Analysis.*—Calculated for $C_{26}H_{24}P_2CuI$: C, 53.03; H, 4.11; P, 10.52; Cu, 10.79; I, 21.55. Found: C, 52.83; H, 4.18; P, 9.97; Cu, 9.92; I, 19.85.

Following the procedure of Example 1, various ethylenebis disubstituted phosphines are reacted with cuprous salts to produce the corresponding organophosphorus-copper complex compounds of the present invention. The results are set forth hereinbelow in Table I.

TABLE I

| Ex. | Phosphine | Cuprous Salt | T., °C. | Product |
|---|---|---|---|---|
| 2 | Ethylenebis (diphenylphosphine). | CuBr | 23 | [Ethylenebis (diphenylphosphine)] copper (I) bromide. |
| 3 | ___do___ | CuNO₃ | 23 | [Ethylenebis (diphenylphosphine)] copper (I) nitrate. |
| 4 | ___do___ | CuAc | 23 | [Ethylenebis (diphenylphosphine)] copper (I) acetate. |
| 5 | Ethylenebis [bis (β-cyanoethyl) phosphine]. | CuPh | 45 | {Ethylenebis [bis (β-cyanoethyl) phosphine]}-copper (I) phenate. |

TABLE I—Continued

| Ex. | Phosphine | Cuprous Salt | T., °C. | Product |
|---|---|---|---|---|
| 6 | Ethylenebis (diduryl-phosphine). | BuBz | 23 | [Ethylenebis (didurylphosphine)] copper (I) benzoate. |
| 7 | Ethylenebis (dixylylphosphine). | CuI | 23 | [Ethylenebis (dixylylphosphine)] copper (I) iodide. |
| 8 | Ethylenebis (ditolylphosphine). | CuI | 50 | [Ethylenebis (ditolylphosphine)] copper (I) iodide. |
| 9 | Ethylenebis (dixylylphosphine). | CuBr | 23 | [Ethylenebis (dixylylphosphine)] copper (I) bromide. |
| 10 | Ethylenebis (didurylphosphine). | CuI | 23 | [Ethylenebis (didurylphosphine)] copper (I) iodide. |
| 11 | Ethylenebis (di-1-naphthylphosphine). | CuNO₃ | 29 | [Ethylenebis (di-1-naphthylphosphine)]-copper (I) nitrate. |
| 12 | Ethylene[bis (β-cyanoethyl) phosphine]. | CuI | 23 | {Ethylenebis [bis (β-cyanoethyl) phosphine]}-copper (I) iodide. |
| 13 | Ethylenebis (dixylylphosphine). | CuAc | 50 | [Ethylenebis (dixylylphosphine)] copper (I) acetate. |
| 14 | Ethylenebis (ditolylphosphine). | CuPh | 45 | [Ethylenebis (ditolylphosphine)] copper (I) phenate. |
| 15 | Ethylenebis [bis (β-cyanoethyl) phosphine]. | CuBz | 15 | {Ethylenebis [bis(β-cyanoethyl) phosphine]}-copper (I) benzoate. |
| 16 | Ethylenebis (ditolylphosphine). | CuCl | 23 | [Ethylenebis (ditolylphosphine)] copper (I) chloride. |
| 17 | Ethylenebis [bis (β-cyanoethyl) phosphine]. | CuAc | 23 | {Ethylenebis [bis (β-cyanoethyl) phosphine]}-copper (I) acetate. |
| 18 | Ethylenebis [bis (β-cyanoethyl) phosphine]. | CuBr | 30 | {Ethylenebis [bis (β-cyanoethyl) phosphine]}-copper (I) bromide. |
| 19 | Ethylenebis (di-2-naphthylphosphine). | CuPh | 0 | [Ethylenebis (di-2-naphthylphosphine)]-copper (I) phenate. |

Code for Table I: Ac=acetate; Ph=phenate; Bz=benzoate.

Any appropriate flame retardance test may be used to determine the flame-retardant properties of any specific composition of the present invention. One test which is reasonably efficient is that designated as a modified version of ASTM test D–635–56T. The specifications for this test are: a specimen, 5″ in length, 0.5″ in width and 0.045″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If after the two burnings, the strip is not burned to the 4″ mark, the specimen is designated as "self-extinguishing" or "flame-retardent."

*Example 20*

Eighty (80) parts of polyethylene and 20 parts of [ethylenebis(diphenylphosphine)] copper (I) iodide are rolled together on a two-roll mill at about 170° C. The resulting milled composition is molded into strips 5″ in length, 0.5″ in width and 0.045″ in thickness and said strips are then subjected to an art-recognized flame retardance test. The strips pass the test and are therefore designated as flame retardant.

Following the procedure of Example 20, the following examples were carried out utilizing various flame retardants of the instant invention and various thermoplastic resin polymers. The results of these examples are set forth in Table II, below. In each instance, the resultant composition passed the flame-retardance test and was designated as flame and fire retardant. In the table, PE=polyethylene, PAN=polyacrylonitrile, PP=polypropylene, PMMA=poly(methyl methacrylate), PMA=poly(methacrylic acid), PA=poly(acrylic acid), AN=acrylonitrile, ST=styrene and BD=butadiene.

TABLE II

| Example | Resin | Flame-Retardant Compound Produced In Example Number | Percent |
|---|---|---|---|
| 21 | PMMA | 1 | 15 |
| 22 | PA | 6 | 10 |
| 23 | PP | 2 | 25 |
| 24 | PP | 11 | 25 |
| 25 | PAN | 12 | 30 |
| 26 | Mixture of BD-AN (10-75%) and AN-ST (25-90%).* | 8 | 25 |
| 27 | Same as 26 | 1 | 25 |
| 28 | Terpolymer, MMA/ST/AN, (71/19/10). | 4 | 20 |
| 29 | PE | 3 | 20 |
| 30 | AN/ST (90/10) | 7 | 25 |
| 31 | PMMA | 6 | 25 |
| 32 | Same as 30 | 16 | 25 |
| 33 | PE | 10 | 20 |
| 34 | PMMA | 17 | 15 |
| 35 | PMA | 5 | 10 |
| 36 | PP | 14 | 25 |
| 37 | PE | 9 | 20 |
| 38 | Same as 28 | 13 | 20 |
| 39 | PMMA | 15 | 20 |
| 40 | PMMA | 18 | 20 |
| 41 | PP | 19 | 25 |

*U.S. Patent No. 2,439,202.

We claim:

1. A flame retardant composition comprising a thermoplastic polymer produced from at least one ethylenically unsaturated monomer and a flame retarding amount of a compound having the formula

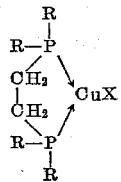

wherein X is a monovalent anion selected from the group consisting of halide, carboxylate, nitrate and phenate anions and R is selected from the group consisting of aryl and β-cyanoethyl radicals.

2. A flame retardant composition according to claim 1 wherein the thermoplastic polymer is a polymer of an α-olefin.

3. A flame retardant composition according to claim 1 wherein the thermoplastic polymer is polyethylene.

4. A flame retardant composition according to claim 1 wherein the thermoplastic polymer is a polymer of a compound having the formula

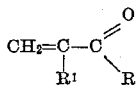

wherein R¹ is selected from the group consisting of hydrogen and a methyl radical and R² is selected from the group consisting of hydrogen and an alkyl radical having from 1 to 6 carbon atoms, inclusive.

5. A flame retardant composition according to claim 1 wherein the thermoplastic polymer is poly(methyl methacrylate).

6. A flame retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

7. A flame retardant composition according to claim 1 wherein R is a phenyl radical.

8. A flame retardant composition according to claim 1 wherein X is chlorine.

9. A flame retardant composition according to claim 1 wherein R is a phenyl radical and X is chlorine.

References Cited by the Examiner
UNITED STATES PATENTS

| | | | |
|---|---|---|---|
| 2,599,400 | 6/1952 | Leerburger | 260—89.5 |
| 2,880,223 | 3/1959 | Coates et al. | 260—438 |
| 2,909,544 | 10/1959 | Birum | 260—438 |
| 2,984,654 | 5/1961 | Agius | 260—89.5 |

JOSEPH L. SCHOFER, *Primary Examiner.*

H. WONG, *Assistant Examiner.*